(12) United States Patent
Fein et al.

(10) Patent No.: US 7,877,456 B2
(45) Date of Patent: Jan. 25, 2011

(54) DATA FILE FORWARDING STORAGE AND SEARCH

(75) Inventors: Gene Fein, Malibu, CA (US); Edward Merritt, Lenox, MA (US)

(73) Assignee: Post Dahl Co. Limited Liability Company, Dover, DE (US)

( * ) Notice: Subject to any disclaimer, the term of this patent is extended or adjusted under 35 U.S.C. 154(b) by 279 days.

(21) Appl. No.: 12/099,498

(22) Filed: Apr. 8, 2008

(65) Prior Publication Data
US 2009/0254567 A1 Oct. 8, 2009

(51) Int. Cl.
G06F 15/16 (2006.01)
(52) U.S. Cl. ...................... 709/212; 709/213
(58) Field of Classification Search ............... 709/212, 709/213
See application file for complete search history.

(56) References Cited

U.S. PATENT DOCUMENTS

| | | | |
|---|---|---|---|
| 5,787,258 A | 7/1998 | Costa et al. | |
| 6,151,395 A | 11/2000 | Harkins | |
| 6,260,159 B1 | 7/2001 | Garnett et al. | |
| 6,505,213 B1 | 1/2003 | Kamada et al. | |
| 6,684,258 B1 | 1/2004 | Gavin et al. | |
| 6,745,289 B2 | 6/2004 | Gruner et al. | |
| 6,985,476 B1 * | 1/2006 | Elliott et al. | 370/349 |
| 7,061,923 B2 | 6/2006 | Dugan et al. | |
| 7,103,824 B2 | 9/2006 | Halford | |
| 7,120,631 B1 | 10/2006 | Vahalia et al. | |
| 7,143,170 B2 | 11/2006 | Swildens et al. | |
| 7,191,298 B2 | 3/2007 | Kaminsky et al. | |
| 7,277,941 B2 | 10/2007 | Ignatius et al. | |
| 7,327,731 B1 | 2/2008 | Kumar et al. | |
| 7,404,002 B1 | 7/2008 | Pereira | |
| 7,430,584 B1 | 9/2008 | Fein et al. | |
| 7,631,052 B2 | 12/2009 | Fein et al. | |
| 2002/0194371 A1 | 12/2002 | Kadoi | |

(Continued)

FOREIGN PATENT DOCUMENTS

EP 1 048 998 11/2000

(Continued)

OTHER PUBLICATIONS

Tsutomu Akasaka, "Remote Copy Technology of ETERNUS6000 and ETERNUS3000 Disk Arrays," Fujitsu Sci. Tech. J., 42.1, pp. 9-16, Jan. 2006.

(Continued)

*Primary Examiner*—Kenny S Lin
(74) *Attorney, Agent, or Firm*—Knobbe Martens Olson & Bear LLP

(57) ABSTRACT

Methods and apparatus, including computer program products, for data forwarding storage and search. A method includes, in a network of interconnected computer systems, receiving a request from a source system in the network to store a data file, directing the data file to a computer memory of a first computer system in a network, saving a file name of the data file in an index file associated with a central server in the network, scrambling a copy of the data file, saving the copied scrambled data in a database of scrambled data files associated with the central server, and continuously forwarding the data file from the first computer memory to other computer memories in the network without storing on any physical storage device in the first network.

21 Claims, 7 Drawing Sheets

U.S. PATENT DOCUMENTS

| | | |
|---|---|---|
| 2003/0158958 A1 | 8/2003 | Chiu |
| 2004/0064633 A1 | 4/2004 | Oota |
| 2004/0223503 A1 | 11/2004 | Lynch et al. |
| 2004/0250029 A1 | 12/2004 | Ji et al. |
| 2005/0044162 A1 | 2/2005 | Liang et al. |
| 2005/0201409 A1 | 9/2005 | Griswold et al. |
| 2005/0243823 A1 | 11/2005 | Griswold et al. |
| 2006/0031593 A1 | 2/2006 | Sinclair |
| 2006/0091007 A1 | 5/2006 | Inoue et al. |
| 2006/0143505 A1 | 6/2006 | Olarig |
| 2006/0242212 A1 | 10/2006 | Brinkmann et al. |
| 2007/0055765 A1 | 3/2007 | Lisiecki et al. |
| 2007/0073965 A1 | 3/2007 | Rajakarunanayake |
| 2007/0186068 A1 | 8/2007 | Agrawal |
| 2007/0195772 A1 | 8/2007 | Shadish |
| 2008/0013448 A1 | 1/2008 | Horie et al. |
| 2008/0037777 A1 | 2/2008 | Ignatius et al. |
| 2008/0059495 A1* | 3/2008 | Kiessig et al. ............ 707/100 |
| 2008/0071855 A1 | 3/2008 | Farber et al. |
| 2009/0006808 A1 | 1/2009 | Blumrich et al. |
| 2009/0067322 A1* | 3/2009 | Shand et al. ............ 370/225 |
| 2009/0141621 A1* | 6/2009 | Fan et al. ............ 370/223 |
| 2009/0238167 A1 | 9/2009 | Fein et al. |
| 2009/0254567 A1 | 10/2009 | Fein et al. |

FOREIGN PATENT DOCUMENTS

| | | | |
|---|---|---|---|
| EP | 1 357 476 A | 10/2003 | |
| EP | 1406446 A1 | 4/2004 | |
| EP | 1322068 B1 | 11/2006 | |
| EP | 1 798 934 A1 | 6/2007 | ........ 29/8 |
| EP | 1 798 937 A1 | 6/2007 | ........ 29/8 |
| EP | 1798934 A1 | 6/2007 | |
| EP | 1798937 A1 | 6/2007 | |
| EP | 1826968 A1 | 8/2007 | |
| EP | 1485787 B1 | 10/2007 | |
| EP | 1776639 B1 | 12/2007 | |
| EP | 1479236 B1 | 1/2008 | |
| JP | 2002-268952 | 9/2002 | |
| WO | WO 02/052417 | 7/2002 | |
| WO | WO 2006/124217 | 11/2006 | |
| WO | WO 2009/117259 | 9/2009 | |
| WO | WO 2009/126418 | 10/2009 | |

OTHER PUBLICATIONS

Cheeha Kim, "An Efficient Multicast Data Forwarding Scheme for Mobile Ad Hoc Networks," Information Networking, Convergence in Broadband and Mobile Networking, International Conference, ICOIN 2005.

Ertaul et. al., "Implementation of Homomorphic Encryption Schemes for Secure Packet Forwarding in Mobile Ad Hoc Networks (MANETs)," IJCSNS, vol. 7, No. 11, pp. 132-141, Nov. 2007.

Ertaul et. al., "ECC Based Threshold Cryptography for Secure Data Forwarding and Secure Key Exchange in MANET (I)," NETWORKING 2005, LNCS 3462, pp. 102-113, 2005.

Huang et. al., "Secure Data Forwarding in Wireless Ad Hoc Networks," IEEE International Conference, pp. 3525-3531, 2005.

Ito, et al., "Technologies of ETERNUSVS900 Storage Virtualization Switch," Fujitsu Sci. Tech. J., 42.1 pp. 17-23, Jan. 2006.

Komandur. et. al., "SPAM: A Data Forwarding Model for Multipoint-to-Multipoint Connection Support in ATM Networks," IC³N, IEEE Computer Society, pp. 1-7, Sep. 1997.

Lusheng Ji et. al., "On Providing Secure and Portable Wireless Data Networking Services: Architecture and Data Forwarding Mechanisms," IPSJ Journal, vol. 45, No. 10, pp. 2261-2269, Oct. 2004.

Akasaka Fujitsu Sci. Tech. J., 42, 1, p. 9-16 (Jan. 2006).

Ito Fujitsu Sci. Tech. 42, 1, p. 17-23 (Jan. 2006).

International Search Report and Written Opinion, PCT/US2009/037579, dated Jun. 24, 2009, 12 pages.

International Search Report and Written Opinion, PCT/US2009/036161, dated Sep. 4, 2009 in 13 pgs.

Non-Final Office Action mailed May 14, 2009, re U.S. Appl. No. 12/132,804.

Notice of Allowance mailed Aug. 7, 2008, re U.S. Appl. No. 12/046,757.

Notice of Allowance mailed Jul. 15, 2009, re U.S. Appl. No. 12/132,804.

Notice of Allowance mailed Jul. 26, 2010, re U.S. Appl. No. 12/240,802.

International Report on Patentability and Written Opinion Re PCT/US2009/036171 dated Sep. 21, 2010.

PCT International Report on Patentability and Written Opinion re PCT/US2009/037579, dated Oct. 12, 2010.

\* cited by examiner

DATA FILE FORWARDING STORAGE AND SEARCH

BACKGROUND

At least some embodiments disclosed herein relate to data storage, and more particularly, to data file forwarding storage and search.

The volume of data that must be stored by individuals, organizations, businesses and government is growing every year. In addition to just keeping up with demand, organizations face other storage challenges. With the move to on-line, real-time business and government, critical data must be protected from loss or inaccessibility due to software or hardware failure. Today, many storage products do not provide complete failure protection and expose users to the risk of data loss or unavailability. For example, many storage solutions on the market today offer protection against some failure modes, such as processor failure, but not against others, such as disk drive failure. Many organizations are exposed to the risk of data loss or data unavailability due to component failure in their data storage system.

The data storage market is typically divided into two major segments, i.e., Direct Attached Storage (DAS) and Network Storage. DAS includes disks connected directly to a server.

Network Storage includes disks that are attached to a network rather than a specific server and can then be accessed and shared by other devices and applications on that network. Network Storage is typically divided into two segments, i.e., Storage Area Networks (SANs) and Network Attached Storage (NAS).

A SAN is a high-speed special-purpose network (or subnetwork) that interconnects different kinds of data storage devices with associated data servers on behalf of a larger network of users. Typically, a SAN is part of the overall network of computing resources for an enterprise. A storage area network is usually clustered in close proximity to other computing resources but may also extend to remote locations for backup and archival storage, using wide area (WAN) network carrier technologies.

NAS is hard disk storage that is set up with its own network address rather than being attached to the local computer that is serving applications to a network's workstation users. By removing storage access and its management from the local server, both application programming and files can be served faster because they are not competing for the same processor resources. The NAS is attached to a local area network (typically, an Ethernet network) and assigned an IP address. File requests are mapped by the main server to the NAS file server.

All of the above share one common feature that can be an Achilles tendon in more ways than one, i.e., data is stored on a physical medium, such as a disk drive, CD drive, and so forth.

SUMMARY OF THE DESCRIPTION

The present invention provides methods and apparatus, including computer program products, for data file forwarding storage and search.

In one aspect, the invention features a method including, in a network of interconnected computer systems, receiving a request from a source system in the network to store a data file, directing the data file to a computer memory of a first computer system in a network, saving a file name of the data file in an index file associated with a central server in the network, scrambling a copy of the data file, saving the copied scrambled data in a database of scrambled data files associated with the central server, and continuously forwarding the data file from the first computer memory to other computer memories in the network without storing on any physical storage device in the first network.

In embodiments, the method includes receiving a query from the source system in the network to retrieve a data file being continuously forwarded in the a network of interconnected computer systems, searching the database of scrambled data files represented by the index of file names for a match of the keyword or keywords, and if a match of the keyword or keywords is found among the scrambled data files, generating a list of filenames containing the keyword or keywords.

In another aspect, the invention features a system including a network of interconnected computer systems, each of the computer systems configured to receive a request from a source system in the network to store a data file, direct the data file to a computer memory of a first computer system in a network, save a file name of the data file in an index file associated with a central server in the network, scramble a copy of the data file, save the copied scrambled data in a database of scrambled data files associated with the central server, detect a presence of the data file in memory of the specific node of the network, and forward the data file to another computer memory of a node in the network of interconnected computer system nodes without storing on any physical storage device.

In embodiments, the central server is configured to receive a query from the source system in the network to retrieve a data file being continuously forwarded in the a network of interconnected computer systems, search the database of scrambled data files represented by the index of file names for a match of the keyword or keywords, and if a match of the keyword or keywords is found among the scrambled data files, generate a list of filenames containing the keyword or keywords.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

The embodiments are illustrated by way of example and not limitation in the figures of the accompanying drawings in which like references indicate similar elements.

DETAILED DESCRIPTION

Unlike peer to peer networks, which use data file forwarding in a transient fashion so that the data file is eventually stored on a physical medium such as a disk drive, the present invention is a continuous data file forwarding system, i.e., data files are stored by continually forwarding them from one node memory to another node memory.

Figure 1:
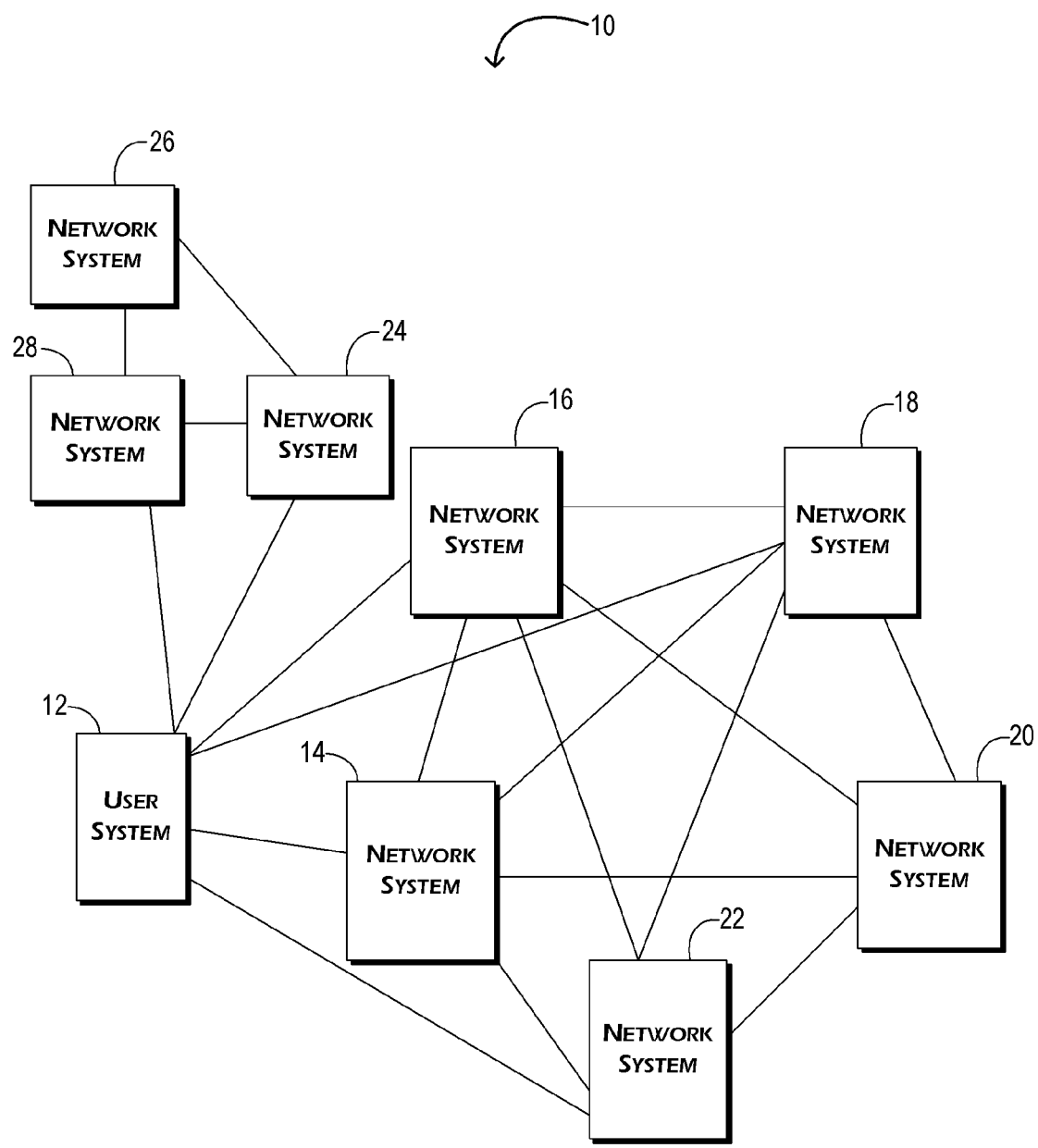
FIG. 1 is a block diagram of an exemplary system.

As shown in FIG. 1, an exemplary system 10 includes a user system 12 and a number of network systems 14, 16, 18, 20, 22. Each of the network systems 14, 16, 18, 20, 22 can be considered to be a node in the system 10 and one such network system may be designated as a central server, such as network system 14, which may assume a control position in system 10. Each of the nodes 14, 16, 18, 20, 22 may be established as a privately controlled network of peers under direct control of the central server 14. Peered nodes may also be a mix of private and public nodes, and thus not under the direct physical control of the central server 14. The system 10 may also be wholly public where the central server 14 (or servers) has no direct ownership or direct physical control of any of the peered nodes.

In one example, nodes 14, 16, 18, 20 and 22 are considered to be a private network. In a private network, an administrator controls the nodes and may designate which node is the central server. The system 10 can also include one or more additional nodes. For example, nodes 24, 26 and 28. These nodes 24, 26 and 28 are considered to be part of one or more public networks in which the administrator has little or no control.

Figure 2:
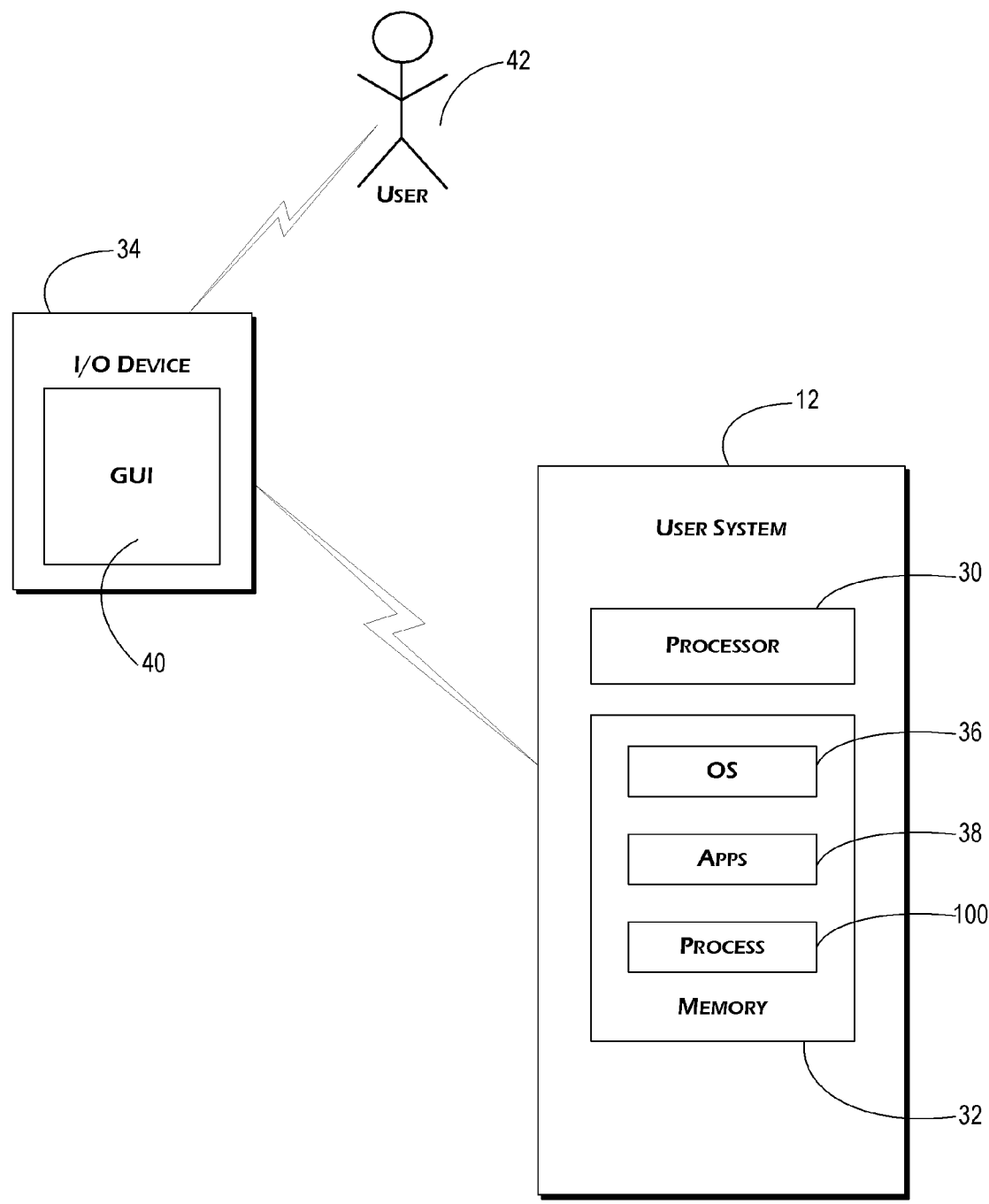
FIG. 2 is a block diagram of an exemplary user system.

As shown in FIG. 2, the user system 12 can include a processor 30, memory 32 and input/output (I/O) device 34. Memory 32 can include an operating system (OS) 36, such as Linux, Apple® OS or Windows®, one or more application processes 38, and a storage process 100, explained in detail below. Application processes 38 can include user productivity software, such as OpenOffice or Microsoft® Office. The I/O device 34 can include a graphical user interface (GUI) 40 for display to a user 42.

Figure 3:
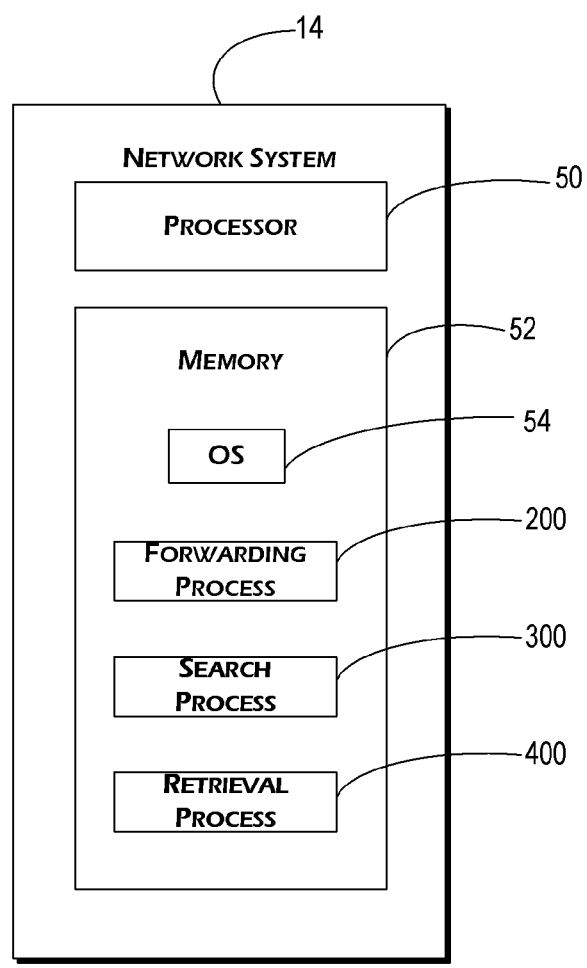
FIG. 3 is a block diagram of an exemplary network system.

As shown in FIG. 3, each of the network systems, such as network system 14, can include a processor 50 and memory 52. Memory 52 can include an OS 54, such as Linux, Apple® OS or Windows®, a data file forwarding process 200, a search process 300 and a retrieval process 400, fully described below.

In traditional systems, application processes 38 need to store, delete, search and retrieve data files. In these traditional systems, a data file is stored on local or remote physical devices. And in some systems, this data file can be segmented into different pieces or packets and stored locally or remotely on physical mediums of storage. Use of fixed physical data storage devices add cost, maintenance, management and generate a fixed physical record of the data, whether or not that is the desire of the user 42.

The present invention does not use fixed physical data storage to store data files. When a request to store a data file is received by the central server 14 from storage process 100, the data file is directed to a node memory in the system 10 where it is then continuously forwarded from node memory to node memory in the system 10 by the data file forwarding process 200 in each of the network nodes without storing on any physical storage medium, such as a disk drive. The forwarded data file resides only for a very brief period of time in the memory of any one node in the system 10. Data files are not stored on any physical storage medium in any network node.

When a request to retrieve a data file is received by the central server 14 from storage process 100, the requested data file, which is being forwarded from node memory to node memory in the system 10, is retrieved.

Data files forwarded in this manner can be segmented and segments forwarded as described above. Sill, the segmented data is not stored on any physical storage medium in any network node, but forwarded from the memory of one node to the memory of another node.

Data files being forwarded in this manner can be deleted and thus no longer forwarded from node memory to node memory.

Figure 4:
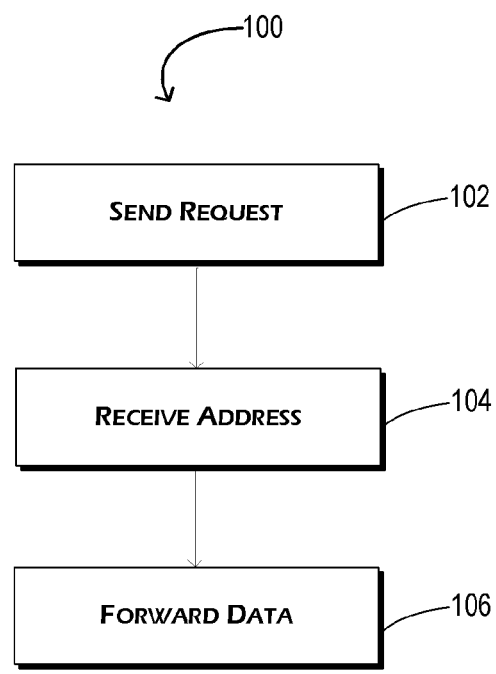
FIG. 4 is a flow diagram of a process.

As shown in FIG. 4, storage process 100 includes sending (102) a request to a central server 14 to store or retrieve a data file. If the request is a retrieve data file request, storage process 100 receives the requested data file from the central server 14 or node in the network.

If the request to the central server 14 is a store data file request, storage process 100 receives (104) an address of a node from the central server 14 and forwards (106) the data file to the node memory represented by the received address.

Figure 5:
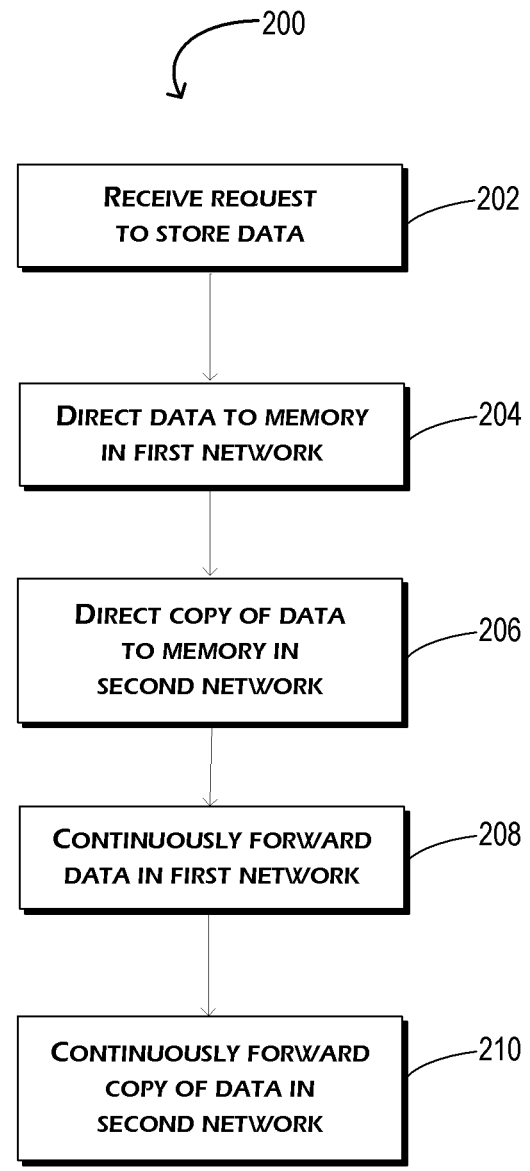
FIG. 5 is a flow diagram of a process.

As shown in FIG. 5, data file forwarding process 200 includes receiving (202) a request from a source system in a first network to store a data file.

Process 200 directs (204) the data file to a computer memory in a network. Process 200 saves (206) a file name of the data file, and in some implementations, a file type, a username and a date stamp, in an index file associated with the central server 14; the actual data contained in the data file is not stored on any physical medium. The index file is used to search for data files during the search process 300, described fully below. Process 200 scrambles (208) a copy of the contents of the data file and saves (210) the copied scrambled data in memory or on a physical storage device associated with the central server 14.

For example, assume a data file named "myfile.txt" includes the following text:

This is an example of data contained in an exemplary data file. The text herein is maintained as written in the data file and the data file continuously forwarded from node memory to node memory without storing on a physical medium.

Scrambling (208) a copy of the above data file may, in one example, results in the following scrambled data:

to without storing on a physical medium example node this contained exemplary herein file from maintained text data and the in continuously is an of forwarded memory Only this scrambled data, indexed by file name, is saved to physical storage—no unscrambled data file is stored in any physical medium, such as a disk drive. Saving the copied scrambled data aids in maintaining security and in searching for data files being continuously forwarded.

Process 200 continuously forwards (212) the data file from the first computer memory to other computer memories in the network without storing on any physical storage device in the network. Continuously forwarding (212) includes detecting a presence of the data file in memory of the specific node of the network and forwarding the data file to another computer memory of a node in the network of interconnected computer system nodes without storing any physical storage device.

In one specific example, at the point of entry to a node, forwarded data in the data file undergoes an encrypted "handshake" with the node or central server 14 or user. This can be a public or private encryption system, such as the Cashmere system, which can use public-private keys. Cashmere decouples the encrypted forwarding path and message payload, which improves the performance as the source only needs to perform a single public key encryption on each message that uses the destination's unique public key. This has the benefit that only the true destination node will be able to decrypt the message payload and not every node in the corresponding relay group. Cashmere provides the capability that the destination can send anonymous reply messages without knowing the source's identity. This is done in a similar way, where the source creates a reply path and encrypts it in a similar manner as the forwarding path.

In another example, other routing schemes are utilized.

New nodes and node states may be added and/or deleted from the system 10 based upon performance. Users may have access to all nodes or may be segmented to certain nodes or "node states" by the central server(s) or via the specific architecture of the private, public or private-public network.

Individual nodes, nodes states and supernodes may also be extranet peers, wireless network peers, satellite peered nodes, Wi-Fi peered nodes, broadband networks, and so forth, in public or private networks. Peered nodes or users may be used as routing participants in the system 10 from any valid peer point with the same security systems employed, as well as custom solutions suitable for the rigors of specific deployments, such as wireless encryption schemes for wireless peers, and so forth.

In process 200, rather than have data files cached or held in remote servers, hard drives or other fixed storage medium, the data files are passed, routed, forwarded from node memory to node memory. A user on the system may authorize more than one user to have access to the data file.

A primary goal in process 200 is to generate a data storage and management system where the data file is never fixed in physical storage, but in fact, is continually being routed/forwarded from node memory to node memory. The path of the nodes to which a data file is forwarded may also be altered by the central server 14 to adjust for system capacities and to eliminate redundant paths of data files that may weaken the security of the network due to the increased probability of data file path without this feature.

Figure 6:
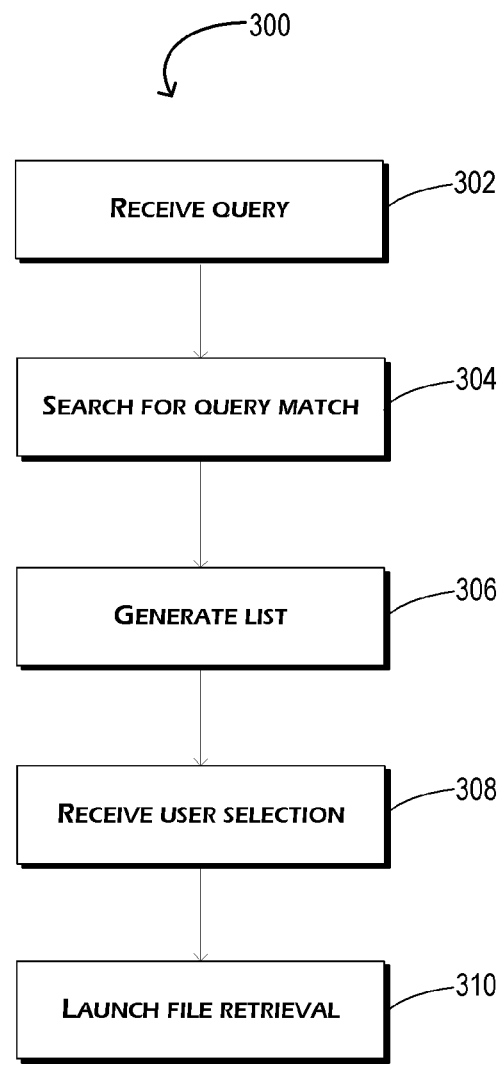
FIG. 6 is a flow diagram of a process.

As shown in FIG. 6, the search process 300 includes receiving (302) a query. Example queries include filenames, file types, usernames, dates and so forth. In one example, the query is a keyword or keywords. Search process 300 searches (304) the database of scrambled files represented by the index of file names for a match of the keyword or keywords. If a match of the keyword or keywords is found among the scrambled files, process 300 generates (306) a list of filenames containing the keyword or keywords. In one example, the list of file names is displayed to a user on an input/output device, enabling the user to select one of the file names. In another example, the list of filenames displayed includes supplemental information with respect to the file, such as, file type, file size, date saved and/or last modified, and so forth. Process 300 receives (308) a user selection of one of the filenames contained in the generated list of file names. The user selection can include a mouse click, a key board input, an audio input, and so forth, indicating a selected filename.

Process 300 launches (310) a file retrieval process 400.

Figure 7:
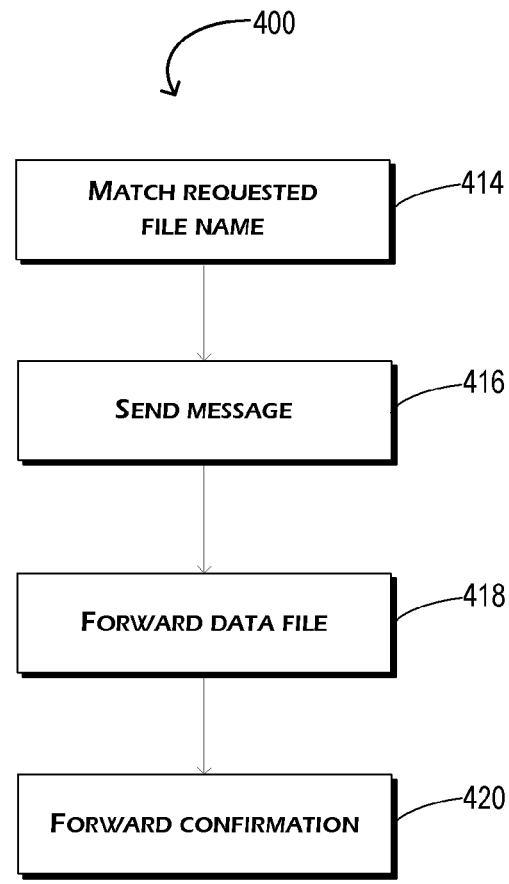
FIG. 7 is a flow diagram of a process.

As shown in FIG. 7, the file retrieval process 400 matches (414) the requested filename at the central server using a hash mark or other unique code that can be "sniffed" by the node upon the data entering the node via the encryption handshake. This can occur by pinging the nodes in the network. Process 400 sends (416) the message to return the data to the user directly to the node or node state where the central server believes the data will likely appear. The more the central server can narrow the node state that it pings to, then the more efficient the retrieval will become and the less burdened by unnecessary messaging traffic to nodes that are not necessary for a transaction between the central server and the node capable of forwarding the data.

Once the correct node receives the message to forward the data in node memory to the requester, process 400 forwards (418) in node memory the data to the requester and forwards (420) a confirmation message that the data has been sent to the user. This routing message may be sent directly to the central server or may be passed to the central server or servers via other node(s) or supernode(s) in the system 10. Upon the user receiving the requested data the user's application function to automatically ping the central server that the data requested has been received. Thus the system 10 creates data storage without caching, downloading and/or storing the data on any physical storage medium. Data storage and management is accomplished via a continuous routing of the data from node memory to node memory, the forwarded data only downloaded when the user requests the data to be returned to the user from the system 10.

In another embodiment, storage process 100 only stores the scrambled data along with filename, and in some instances, file type, username, and/or date stamp, while automatically deleting the non-scrambled data file.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A computerized method of storing a data file in a network of computer systems, the method comprising:

receiving a request from a source system to store a data file comprising a plurality of data elements arranged in a first order, wherein the source system is outside of a network of interconnected computer systems;
directing the data file to a random access memory of a computer system in the network;
saving a file name of the data file in an index file;
generating a scrambled data file comprising each of the plurality of data elements arranged in a second order that is different than the first order;
saving the scrambled data file on a storage device, wherein the storage device stores a plurality of scrambled data files; and
continuously forwarding the data file among random access memories of respective computer systems in the network without storing the data file on any fixed physical storage device of the computer systems in the network, wherein fixed physical storage devices include hard disks, magnetic disks, magneto optical disk, and optical disks.

2. The computerized method of claim 1 further comprising:
receiving a query from the source system in the network to retrieve a requested data file being continuously forwarded, the query including one or more keywords; and
searching the plurality of scrambled data files for a match of one or more of the keywords; and
if a match of one or more of the keywords is found among the scrambled data files, generating a list of filenames containing the one or more keywords.

3. The computerized method of claim 2 wherein the list of filenames comprises file information including filenames, file types, dates files were modified, and dates files were saved.

4. A non-transitory machine readable storage medium configured to store software code that is readable by a computing system, wherein the software code is executable on the computing system in order to cause the computing system to perform operations comprising:
receiving a request to store a data file from a source system, the data file comprising a plurality of data elements in a first order;
storing a file name of the data file in a data structure;
generating a scrambled copy of the data file, wherein the scrambled cony of the data file includes the same plurality of data elements of the data file arranged in a second order that is different than the first order;
storing the scrambled copy of the data file on a storage device, wherein the storage device stores a plurality of scrambled data files; and
continuously forwarding the data file between random access memories of the computer systems in the network without storing the data file on any fixed physical storage device of the computer systems in the network.

5. The non-transitory machine readable storage medium of claim 4, wherein the method further comprises:
receiving a query to retrieve a particular data file, the query including one or more keywords;
searching the plurality of scrambled data files for a match of the one or more keywords; and
if a match of the one or more keywords is found in one or more scrambled data files, generating a list of filenames corresponding to the matched one or more scrambled data files.

6. The non-transitory machine readable storage medium of claim 5, wherein the method further comprises:
displaying the list of filenames on an input/output device; and
receiving a selection of one of the filenames in the displayed list of filenames.

7. The non-transitory machine readable storage medium of claim 6 wherein the method further comprises retrieving the data file associated with the selected one of the filenames from a random access memory of a computer system of the network.

8. A computer system for storing data files in a network of interconnected computers, the computer system comprising:
a memory device;
at least one network interface configured to allow the computer system to communicate with a network of interconnected computer systems, each of the computer systems in the network comprising a random access memory; and
a processor configured to
initiate continuous forwarding of a data file between random access memories of the computer systems of the network such that the data file is not stored on any fixed physical storage device of the computer systems of the network, wherein the data file comprises a plurality of data elements in a first order;
generate a scrambled copy of the data file, wherein the scrambled copy of the data file includes the same plurality of data elements of the data file arranged in a second order that is different than the first order; and
store the scrambled copy of the data file in a data structure of scrambled data files, wherein the data structure indicates an association between the scrambled copy of the data file and the data file.

9. The computer system of claim 8, wherein the processor is further configured to identify any scrambled data files matching a search query.

10. The computer system of claim 9, wherein the processor is further configured to retrieve respective data files associated with any identified scrambled data files from the network of computer systems.

11. The computer system of claim 8, wherein the data file is received from a source computer system that is outside of the network of computer systems.

12. The computer system of claim 8, wherein generating a scrambled copy of the data file comprises:
copying the data file;
identifying data file segments of the copied data file; and
altering an order of the data file segments of the copied data file.

13. The computer system of claim 12, wherein at least one data file segments comprises a text word.

14. The computer system of claim 8, wherein the data file comprises a plurality of text words and the scrambled copy of the data file comprises the same text words as the data file in an order that is different than the data file.

15. The computer system of claim 8, further comprising encrypting the data file so that only the computer system associated with the random access memory receiving the data file can decrypt the data file.

16. The computer system of claim 8, wherein the data file comprises a forwarding path and a payload, wherein the forwarding path is decoupled from and encrypted separately from the payload.

17. The computer system of claim 8 wherein the processor is further configured to:
receive a query to retrieve a data file being continuously forwarded between the random access memories of the computer systems of the network, the query including one or more keywords;
search the data structure of scrambled data files for a match of the one or more keywords;

in response to matching one or more keywords in at least one scrambled data file, generate a list of filenames associated with the at least one matched scrambled data file containing the one or more keywords;

receive a selection of a filename from the list of filenames; and retrieve the data file corresponding to the selected filename.

18. A computerized method of storing data in a network of computer systems, the method comprising:

receiving a data file from a source computer system, the data file comprising a plurality of data elements in a first order;

saving file identification information associated with the data file;

generating a scrambled copy of the data file, the scrambled copy of the data file including the same plurality of data elements of the data file arranged in a second order that is different than the first order; and continuously forwarding the data file among the computer systems of the network so that the data file is not stored on any fixed physical storage devices of the computer systems of the network.

19. The computerized method of claim 18, wherein the file identification information comprises one or more of a file name, a file type, a file size, a date saved, and a date last modified.

20. The computerized method of claim 18, further comprising:

detecting the addition of a new computer system to the network; and continuously forwarding the data file among the computer systems of the network, including the new computer system, without storing the data file on any fixed physical storage device of the computer systems of the network.

21. The computerized method of claim 18, further comprising:

adding the new computer system to a data forwarding sequence; and continuously forwarding the data file among the computer systems of the network according to the data forwarding sequence.

\* \* \* \* \*

UNITED STATES PATENT AND TRADEMARK OFFICE
CERTIFICATE OF CORRECTION

| | | |
|---|---|---|
| PATENT NO. | : 7,877,456 B2 | Page 1 of 1 |
| APPLICATION NO. | : 12/099498 | |
| DATED | : January 25, 2011 | |
| INVENTOR(S) | : Fein et al. | |

It is certified that error appears in the above-identified patent and that said Letters Patent is hereby corrected as shown below:

Column 7, line 41, in Claim 4, delete "cony" and insert -- copy --.

Column 8, line 14, in Claim 8, delete "to" and insert -- to: --.

Signed and Sealed this
Seventeenth Day of May, 2011

David J. Kappos
*Director of the United States Patent and Trademark Office*